No. 815,290. PATENTED MAR. 13, 1906.
J. B. GREER.
STRAINER FOR FILTERS.
APPLICATION FILED APR. 29, 1904.
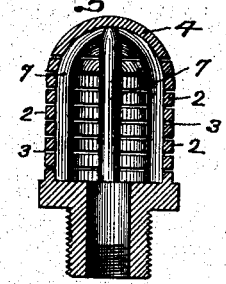
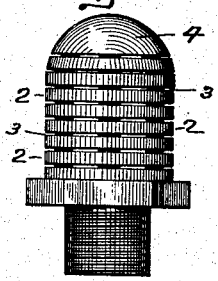
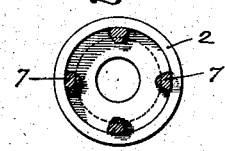
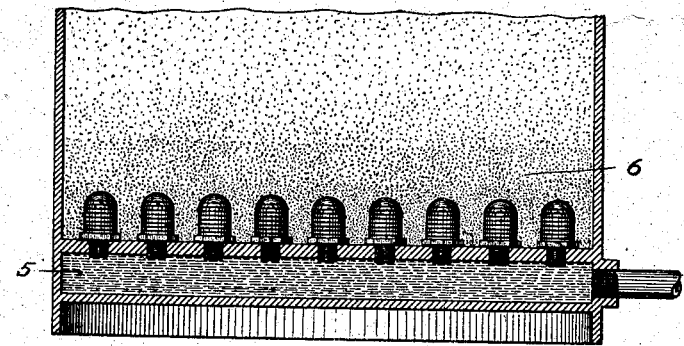
Witnesses:
Inventor:

UNITED STATES PATENT OFFICE.

JAMES BOYD GREER, OF PITTSBURG, PENNSYLVANIA, ASSIGNOR TO GREER FILTER COMPANY, OF PHILADELPHIA, PENNSYLVANIA, A CORPORATION OF PENNSYLVANIA.

STRAINER FOR FILTERS.

No. 815,290. Specification of Letters Patent. Patented March 13, 1906.

Application filed April 29, 1904. Serial No. 205,464.

*To all whom it may concern:*

Be it known that I, JAMES BOYD GREER, of Pittsburg, in the county of Allegheny and State of Pennsylvania, have invented a new and useful Improvement in Filters, of which the following is a full, clear, and exact description.

My invention relates to improvements in filters; and it consists in the combination, with the filtering material, of a strainer composed of a series of rings having interior supports and spaces between the rings and a solid or imperforate head. This strainer is adapted to be used in filters both as a strainer proper or collector and also in washing or cleaning the filter, in which latter operation the water enters through the strainer and then passes out laterally therefrom into the filtering material; and the object of the invention is to provide a strainer which in washing the filter will allow the water to pass freely into the filtering material and yet in such manner as not to cut channels therein.

I will now describe my invention so that others skilled in the art may manufacture and use the same, reference being had to the accompanying drawings, forming a part of this specification, in which—

Figure 1 is a vertical sectional view of my improved strainer. Fig. 2 is a side elevation of the same. Fig. 3 is a horizontal sectional view, and Fig. 4 is a vertical sectional view of a portion of a filter provided with my improved strainer.

Like symbols of reference indicate like parts wherever they occur.

My improved strainer is composed of a series of superimposed rings 2, placed one above the other and concentric with each other, there being a space 3 between each of these rings through which the water may pass freely into the body of the filter. On top of these rings 2 is a dome-shaped solid head 4. At the base of the rings is a suitable threaded portion by means of which the strainer may be coupled with the pipe or pipes through which the water is carried away from the filter or is supplied to the filter in washing, or it may be so inserted in the flooring of the filter-chamber as to communicate with a chamber 5 and to discharge the water when washing the filter into the body of gravel, sand, or other filtering material 6. Inside of the rings 2 are supporting-ribs 7, which are of small area in cross-section and the corners of which are preferably rounded, so that the water as it passes through the body of the strainer and the spaces between the rings 2 will pass out around the entire periphery of the strainer. The purpose of this construction is to prevent the flow of water from being concentrated into jets, which would soon cut channels in the filtering material which is packed around the strainer. The function of the dome-shaped solid head is to deflect the water and to cause an even and regular flow through all portions of the spaces or orifices between the rings.

These strainers may be arranged within the body of the filter in any manner desired, either by opening directly into the water-pipes or into the floor of the water-chamber, as is shown in the drawings, while the bodies of the strainers extend up into the filtering material.

In the manufacture of these strainers I prefer to cut them out of a solid piece of brass or other material, care being taken to have the annular grooves or spaces between the rings of such depth as to allow the water to pass from these orifices in solid sheets—that is, the groove should be sufficient in depth to allow the water divided by the supporting-ribs to unite before it passes into the filtering material. I do not desire, however, to limit myself to this method of manufacture, as the rings might be formed separately, united together by supporting-ribs, which in turn would be secured to the base and head, or the base, head, and supporting-ribs may be formed of a single piece and the rings secured thereto.

Although I have spoken of rings and a strainer cylindrical in form, I do not desire to limit myself to this or any other shape, although such shape is preferable, it being best adapted to cause an even distribution of the water about the strainer.

The advantages of my invention will be appreciated by those skilled in the art. Owing to the fact that the orifices through which the water passes into the filtering material are continuous and owing to the solid dome-shaped head, the water is caused to pass evenly into the filtering material.

Another advantage of my improvement is that the annular spaces between the rings are not apt to be filled or clogged by the filtering material, for the reason that there are but two points of contact, one above and one below, and the filtering material is therefore not liable to become fixed in the spaces.

Having thus described my invention, what I claim, and desire to secure by Letters Patent, is—

1. The combination with a filtering-bed composed of granular material, of a strainer embedded in said material and comprising a series of superposed separated rings and an imperforate dome-shaped head forming a hollow chamber, said rings being supported at their inner edges so as to form continuous spaces between the rings at their outer edges, and a water connection at the bottom of the strainer and opposite the head, substantially as described.

2. The combination with a filtering-bed composed of granular material, of a strainer embedded in said material and comprising a series of superposed separated rings and interior ribs for supporting the rings at their inner edges so as to form continuous spaces between the rings at their outer edges, and a solid or imperforate head, substantially as described.

In testimony whereof I have hereunto set my hand.

JAMES BOYD GREER.

Witnesses:
WM. M. ROBINSON,
STANLEY M. LANGDON.